United States Patent
Kompella (10) Patent No.: US 8,068,442 B1
(45) Date of Patent: *Nov. 29, 2011

(54) SPANNING TREE PROTOCOL SYNCHRONIZATION WITHIN VIRTUAL PRIVATE NETWORKS

(75) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 12/276,988

(22) Filed: Nov. 24, 2008

Related U.S. Application Data (63) Continuation of application No. 11/058,906, filed on Feb. 16, 2005, now Pat. No. 7,463,597.

(60) Provisional application No. 60/604,882, filed on Aug. 27, 2004.

(51) Int. Cl.
*H04L 12/28* (2006.01)

(52) U.S. Cl. ............... 370/256; 370/389; 370/395.5; 370/401; 709/242

(58) Field of Classification Search .......... None
See application file for complete search history.

(56) References Cited

U.S. PATENT DOCUMENTS

| | | | | |
|---|---|---|---|---|
| 7,145,878 B2 * | 12/2006 | Katz | ............... | 370/238 |
| 7,173,934 B2 | 2/2007 | Lapuh et al. | | |
| 7,463,597 B1 * | 12/2008 | Kompella | ............... | 370/389 |
| 7,596,101 B2 * | 9/2009 | Oguchi | ............... | 370/256 |
| 2003/0026209 A1 | 2/2003 | Katz | | |
| 2003/0037162 A1 | 2/2003 | Kotser | | |
| 2004/0037279 A1 | 2/2004 | Zelig et al. | | |
| 2004/0174887 A1 | 9/2004 | Lee | | |
| 2004/0258069 A1 * | 12/2004 | Serbest et al. | ............... | 370/395.5 |
| 2005/0044262 A1 | 2/2005 | Luo | | |
| 2005/0169270 A1 | 8/2005 | Mutou et al. | | |
| 2006/0002370 A1 | 1/2006 | Rabie et al. | | |
| 2007/0183419 A1 | 8/2007 | Kompella | | |

OTHER PUBLICATIONS

Brockners et al., "Metro Ethernet—deploying the extended campus using Ethernet technology," Proceedings of the 28th Annual IEEE International Conference on Local Computer Networks (LCN '03), pp. 594-604, Oct. 20-24, 2003.*

"Beyond The Draft", printed Jun. 7, 2004, 7 pgs. http://vpls.org/vpls_beyond_the_draft.shtml.

IEEE Standard for Local and metropolitan area networks—Common specifications, "Part 3: Media Access Control (MAC) Bridges-Amendment 2: Rapid Reconfiguration", Std. 802.1w-2001, American National Standards Institute, (2001) 108 pgs.

IEEE Standard for Information technology—Telecommunications and information exchange between systems—Local and Metropolitan area networks—Common specifications, "Part 3: Media Access Control (MAC) Bridges", ANSI/IEEE Std 802.1D, (1988), 355 pgs.

Bates et al., "Multiprotocol Extensions for BGP-4", Network Working Group, RFC 2858, Jun. 2000, 11 pages.

(Continued)

*Primary Examiner* — Kwang B Yao
*Assistant Examiner* — Jeffrey M Rutkowski
(74) *Attorney, Agent, or Firm* — Shumaker & Sieffert, P.A.

(57) ABSTRACT

Loop detection information, such as information associated with the Spanning Tree Protocol (STP), is synchronized within virtual private networks. A routing protocol, such as the Border Gateway Protocol (BGP), is extended in a manner that allows STP information or other loop detection information to be opaquely communicated between routing devices across an intermediate network. These techniques may, for example, be useful in environments where Virtual Private LAN Service (VPLS) is run through one or more intermediate networks.

48 Claims, 4 Drawing Sheets

OTHER PUBLICATIONS

Brockners et al., "Metro Ethernet—deploying the extended campus using Ethernet technology," Proceedings of the 28$^{th}$ Annual IEEE International Conference on Local Computer Networks (LCN'03), pp. 594-604, Oct. 20-24, 2003.

Kompella et al., "Virtual Private LAN Service", Network Working Group, May 2003, 16 pages.

Harrison, "VPN Technologies—A Comparison," Data Connection Limited, Feb. 2003, 35 pgs.

Knight et al., "Layer 2 and 3 Virtual Private Networks: Taxonomy, Technology, and Standardization Efforts," IEEE Communications Magazine, vol. 42, No. 6, pp. 124-131, Jun. 2004.

* cited by examiner

FIG. 4

SPANNING TREE PROTOCOL SYNCHRONIZATION WITHIN VIRTUAL PRIVATE NETWORKS

This application is a continuation application of U.S. application Ser. No. 11/058,906, filed Feb. 16, 2005, now U.S. Pat. No. 7,463,597, which claims the benefit of U.S. Provisional Application No. 60/604,882, filed Aug. 27, 2004, the entire content of each of which is incorporated herein by reference.

TECHNICAL FIELD

The invention relates to computer networks and, more particularly, to virtual private networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a data link layer device is a customer premises equipment (CPE) device, such as a switch, modem, Ethernet card, or wireless access point. Traditional L2 networks include Ethernet networks, Asynchronous Transfer Mode (ATM) networks, Frame Relay networks, networks using High Level Data Link Control (HDLC), Point-to-Point (PPP) connections, PPP sessions from Layer 2 Tunneling Protocol (L2TP) tunnels, and Virtual Local Area Networks (VLANs).

In some instances, a layer three (L3) network is used as an intermediate transport network between two or more L2 networks in order to allow communication between the L2 networks. In this type of configuration, the L3 network transparently transports L2 communications between the L2 networks, thereby allowing the L2 networks to share an L2 service. Common protocols for transporting the L2 communications through the intermediate L3 network are label switching protocols, such as Multi-protocol Label Switching (MPLS) protocols, Resource Reservation Protocol (RSVP) and the Label Distribution Protocol (LDP). In a typical environment, a source device, such as a router connected to one of the L2 networks, can request a path through the intermediate network. For example, with MPLS, this path is referred to as a Label Switched Path (LSP), and defines a distinct, dedicated, and guaranteed path through the network to carry MPLS packets from the source to the destination. The MPLS packets encapsulate the L2 communications, thereby effectively shielding the L3 network from the transported L2 information.

One example of an L2 service is the Virtual Private LAN Service (VPLS), also referred to as Point-to-multipoint (P2MP) L2 Virtual Private Networks (VPNs). In general, VPLS allows two or more remote customer networks to be transparently extended through the intermediate network as if the intermediate network does not exist from the perspectives of the customer networks. In particular, L2 communications, such as Ethernet packets, are transported between customer networks via the intermediate network. In a typical configuration, VPLS-enabled routers that are associated with the customer networks define LSPs within the intermediate network to carry encapsulated L2 communications as if these customer networks were directly attached to the same Local Area Network (LAN). To properly communicate via these LSPs, each of these VPLS-enabled routers store L2 information, such as Media Access Control (MAC) addresses, as well as VPLS information, such as local and remote VPLS site information. In this manner, these VPLS-enabled routers provide transparent L2 connectivity across the intermediate network and simulate a direct LAN.

The presence of a data loop may have severe adverse affects on a L2 network. For example, a data loop may result in consumption of significant bandwidth and resources. Thus, it is often necessary to eliminate data loops from the L2 network topology. One typical approach in addressing data loops is to deploy the Spanning Tree Protocol (STP) within the L2 network. In accordance with the STP, devices with the L2 network, such as Ethernet bridges, share information and eliminate loops by reducing the L2 network to a single spanning tree having a single path between end stations.

It is often undesirable, however, to utilize the STP to eliminate loops when one or more intermediate networks provide virtual private networks for remote customer networks. As one example, it is often undesirable to utilize the STP to communicate spanning tree information over the intermediate networks due to the high volume of information exchanged. Moreover, such STP implementations often require the intermediate networks to be "fully-meshed" with respect to STP. In other words, most if not all of the provider routers within the intermediate networks would need to support the STP.

SUMMARY

In general, the invention involves techniques for synchronizing loop detection information, such as information associated with the Spanning Tree Protocol (STP), through an intermediate network. More specifically, the techniques allow a routing protocol, such as the Border Gateway Protocol (BGP), to be extended in a manner that allows STP information or other loop detection information to be communicated between routing devices across an intermediate network. These techniques may, for example, be useful in environments where Virtual Private LAN Service (VPLS) is run through one or more intermediate networks.

In one embodiment, a method comprises receiving information associated with a loop detection protocol from a layer two (L2) device, and communicating the information through an intermediate network via a routing device in accordance with a routing protocol.

In another embodiment, a method comprises receiving information associated with a layer two (L2) network loop detection protocol via a routing protocol, and forwarding the information to an L2 device associated with an L2 network.

In an additional embodiment, a device comprises a control unit that receives L2 loop detection information associated with a loop detection protocol from an L2 device, and wherein the control unit outputs a routing communication to communicate the information via a routing protocol.

In a further embodiment, a device comprises a routing module that receives loop detection information via a routing protocol, and a loop detection module that determines whether one or more loops exist within a network based on the received loop detection information.

In another embodiment, a computer-readable medium comprises instructions for causing a programmable processor to execute a VPLS to form a virtual network between a first L2 network and a second L2 network coupled by an intermediate network, receive spanning tree information from an L2 device of the first L2 network via a spanning tree protocol, and communicate the spanning tree information through the intermediate network via a routing protocol to a routing device associated with the second L2 network.

In another embodiment, a computer-readable medium comprises instructions for causing a programmable processor to maintain routing information that represents a topology of a network, forward packets in accordance with the routing information, receive a routing communication via a routing protocol, wherein the routing communication includes information associated with a loop detection protocol via a routing protocol, and forward the information to a device via the loop detection protocol.

The techniques of the invention may provide one or more advantages. For example, by utilizing an extendible routing protocol to exchange the loop detection information, devices within the intermediate networks need not communicate via an additional loop-detection protocol, such as STP. Moreover, the devices may only exchange the loop detection information via the routing protocol in the event an actual change to the L2 topology has been detected. In this manner, the nature of the routing protocol, which may be a stateful routing protocol, may be leveraged to achieve communication and processing savings.

In addition, the exchange of the loop detection information may allow the devices within the intermediate networks to present a unified view to the devices within the customer networks. For example, edge routers within the intermediate networks that are providing virtual network services to customer networks may utilize the techniques described herein to share loop detection information (e.g., STP information) and appear to operate as a single L2 device, such as an Ethernet bridge, to the customer networks.

As another example, in accordance with the principles of the invention, the routing protocol may be extended to carry the loop detection information opaquely through the intermediate networks. As a result, only a subset of the routing devices within the intermediate network need implement the STP, and the other devices forward the loop detection information as opaque routing information.

Moreover, the use of a routing protocol may be particularly useful to exchange the loop detection information in that routing protocols are generally multicast in nature, i.e., point-to-multipoint. In this manner, the multicast nature of routing protocols may be utilized to effectively exchange the loop detection information between the edge routers of the intermediate networks providing the VPLS service.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
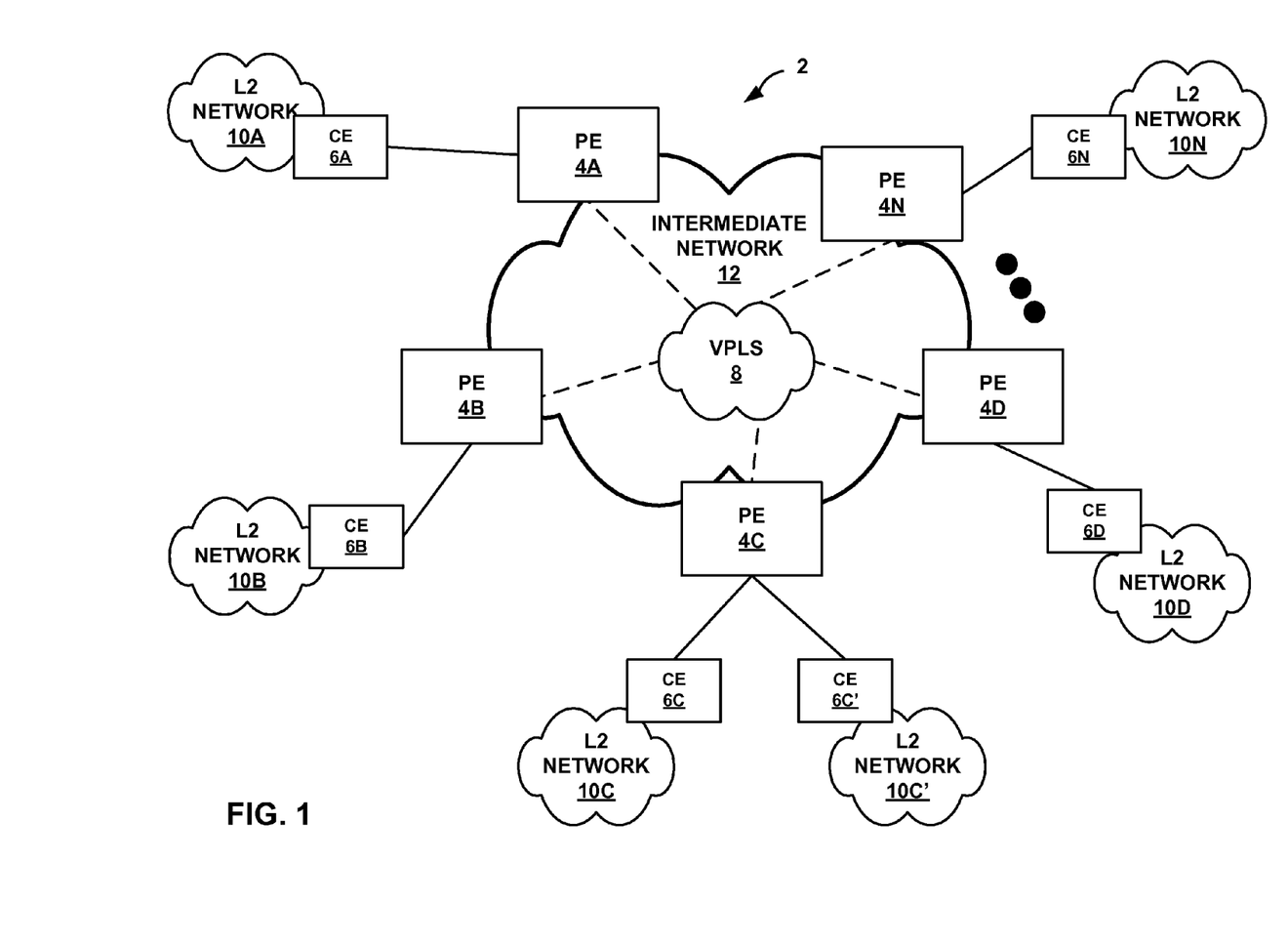
FIG. 1 is a block diagram illustrating an example network environment in which provider edge (PE) routers provide layer two (L2) services for L2 networks through an intermediate network.

FIG. 1 is a block diagram illustrating an example network environment 2 in which provider edge routers 4A-4N (collectively, "PE routers 4") provide layer two (L2) services for L2 networks 10. In particular, PE routers 4 exchange information associated with a loop detection protocol across a Virtual Private LAN Service (VPLS) 8 through an intermediate network 12 as an extended attribute of a routing protocol. For example, PE routers 4 may communicate spanning tree protocol information (STP information) via the Border Gateway Protocol (BGP).

In the example of FIG. 1, each of PE routers 4A-4N is coupled to a respective customer edge Ethernet bridge 6A-6N (collectively, "CE bridges 6"), where the CE bridges 6 are L2 devices associated with L2 networks 10. Although only a single intermediate network 12 is shown, one or more intermediate networks may exist between PE routers 4A-4N.

For exemplary purposes, the techniques are described herein in reference to the Spanning Tree Protocol (STP) and the transportation of Ethernet communications between L2 networks 10. In particular, the techniques are described herein in reference to VPLS, and the synchronization of STP information between PE routers 4.

In general, PE routers 4 represent routing devices that maintain routing information and forward network packets within intermediate network 12 in accordance with the routing information. In order to maintain an accurate representation of the L2 networks 10, PE routers 4 periodically exchange routing information in accordance with one or more routing protocols. For example, PE routers 4 may exchange routing information via the Border Gateway Protocol (BGP), the Intermediate System to Intermediate System (ISIS) protocol, the Open Shortest Path First (OSPF) protocol, the Routing Information Protocol (RIP), or any other routing protocol.

In the example of FIG. 1, PE routers 4 execute VPLS to form a virtual network (indicated as "VPLS 8", FIG. 1) between the various L2 networks 10 associated with CE bridges 6. In other words, PE routers 4 may be viewed as VPLS-enabled routers that allow remote L2 networks 10 to be transparently extended through intermediate network 12. In particular, PE routers 4 transport L2 communications, such as Ethernet packets, between L2 networks 10 via intermediate network 12. PE routers 4 may, for example, implement one or more label switching protocols, such as Multi-protocol Label Switching (MPLS) protocols, Resource Reservation Protocol (RSVP) and the Label Distribution Protocol (LDP). PE routers 4 encapsulate the L2 communications from L2 networks 10 into packets, and communicate the packets between L2 networks 10 via one or more label switched paths (LSPs).

In order to detect and eliminate loops, CE bridges 6 execute a loop detection protocol, such as STP. In accordance with the loop detection protocol, CE bridges 6 maintain loop detection information, such as STP information. For each of CE bridges 6, this information typically specifies a root bridge, a distance to the root bridge and other information useful in detecting loops within the L2 networks.

The loop detection information typically represents the L2 networks as a single tree, e.g., a spanning tree. In accordance with the techniques described herein, CE bridges 6 view PE routers 4 as a node within the spanning tree. Alternatively, PE routers 4 may each operate as independent nodes within the spanning tree. In either case, CE bridges 6 exchange loop detection information with PE routers 4 via the loop detection protocol. For example, CE bridges 6 and PE routers 4 may implement STP, and CE bridges 6 may exchange bridge protocol data units (BPDUs) with respective PE routers 4 to synchronize STP information.

Upon receiving STP information from CE bridges 6, PE routers 4 update their view of the spanning tree based on the newly received STP information. After updating its STP information, each of PE routers 4 communicates the updated STP information to the other PE routers 4 by way of an extended routing protocol. For example, PE routers 4 may exchange STP information as an extended attribute of the BGP. Upon receiving updated STP information by the routing protocol, each of PE routers 4 updates its view of the spanning tree and relays the STP information to its respective one or more of CE bridges 6 using STP.

In this manner, PE routers 4 utilize a routing protocol to exchange loop detection information through intermediate network 12, and allow CE bridges 6 to maintain an accurate and comprehensive spanning tree for L2 networks 10.

The utilization of a routing protocol to convey L2 loop detection information through intermediate network 12 may provide one or more advantages. For example, communication and processing savings may be achieved due to the stateful nature of BGP. As described in further detail below, the stateful nature of BGP may allow STP information to be communicated only when an actual change to the layer two (L2) topology has been detected. As a result, the high-volume of communications associated with STP and other loop detection protocols may be avoided.

In addition, the exchange of STP information may allow PE routers 4 within the intermediate network 12 to present a unified view to CE bridges 6 within the L2 networks 10. For example, PE routers 4 within the intermediate network 12 that provide virtual network services to CE bridges 6 may appear to operate as a single Ethernet bridge to the L2 networks 10.

As another example, the routing protocol may be extended to carry the STP information opaquely through intermediate network 12. As a result, only a subset (i.e., PE routers 4) of the routing devices within intermediate network 12 need implement STP, and these other devices (not shown in FIG. 1) forward the STP information as opaque routing information.

Moreover, the use of a routing protocol such as the BGP may be particularly useful to exchange STP information in that routing protocols are generally multicast in nature. In other words, effective exchange STP information may be achieved between PE routers 4 be multicasting routing information in accordance with the particular routing protocol being used.

Applying these techniques to an existing routing protocol (such as BGP) also leverages use of the existing infrastructure for the protocol, such as the protocol algorithms, operational experience, and administrative processes, such as inter-provider peering agreements. In short, the techniques use an already established communications infrastructure. Consequently, deployment of the techniques described herein may be accelerated by utilization of these existing systems. The established communications infrastructure includes an internal route distribution infrastructure, and external relationships, such as inter-domain BGP sessions to a customer network.

Although described in reference to STP and VPLS, the techniques may readily be applied to other types of loop detection protocols and other types of L2 services. For example, each of the L2 networks 10 may comprise an ATM network, and PE routers 4 may utilize the techniques to transport ATM cells and other information associated with an ATM-related loop detection protocol through intermediate network 12. Other exemplary types of L2 networks for which L2 information may be transported in accordance with the techniques described herein include Frame Relay networks, networks using High Level Data Link Control (HDLC), Point-to-Point (PPP) connections, PPP sessions from Layer 2 Tunneling Protocol (L2TP) tunnels, and Virtual Local Area Networks (VLANs).

Figure 2:
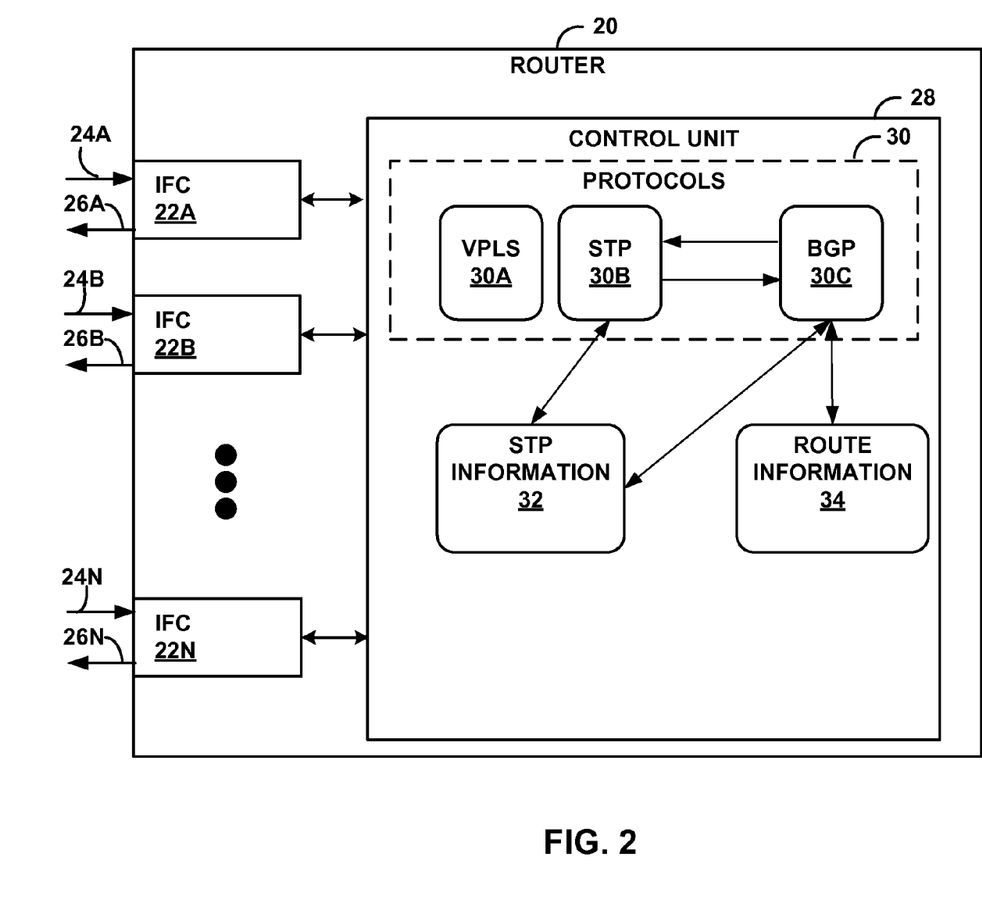
FIG. 2 is a block diagram illustrating an exemplary embodiment of a router that may send or receive loop detection information (e.g., spanning tree information) via a routing protocol in accordance with the principles of the invention.

FIG. 2 is a block diagram illustrating an exemplary embodiment of a router 20 that utilizes a routing protocol to exchange L2 loop detection information in accordance with the principles of the invention. In the exemplary embodiment illustrated in FIG. 2, router 20 includes a control unit 28 and a plurality of interface cards (IFCs) 22A-22N (collectively, "IFCs 22") for communicating packets via input links 24A-24N and output links 26A-26N.

Control unit 28 provides an operating environment for a plurality of protocols 30. For example, VPLS 30A executes within control unit 28 and provides virtual private LAN services to a plurality of L2 networks, such as L2 networks 10. Although not illustrated in FIG. 2, control unit 28 may execute multiple instances of VPLS 30A, thereby providing a plurality of virtual private networks. Control unit 28 may utilize the techniques describe herein to synchronize loop detection information for each of the networks.

In addition, one or more routing protocols, such as BGP 30C, execute within control unit 28 for exchanging routing communications with other routers. Based on the routing communications, control unit 28 maintains route information 34 to accurately reflect the topology of a network and, in particular, routes through the network. Route information 34 may be arranged as a radix tree, one or more tables, lists, or other data structures that store the network routes in the form of network addresses, forwarding next hops, or any other manner.

Upon receiving a packet via one of inbound network links 24, control unit 28 determines a destination for the packet in accordance with route information 34. Control unit 28 forwards the packet on one of outbound network links 26 based on the determination. In this manner, router 20 forwards packet flows, and may be an enterprise router, an edge router, a core router or other routing device within a network.

Further, control unit 28 provides an operating environment for a loop detection protocol, such as STP 30B. STP 30B, for example, maintains STP information 32 and detects loops within one or more L2 networks, such as L2 networks 10 of FIG. 1. More specifically, by way of STP 30B, router 20 exchange STP bridge protocol data units (BPDUs) with other L2 devices, such as CE bridges 6 of FIG. 1, and updates STP information 32 to represent a spanning tree that represents the L2 networks.

In accordance with the principles of the invention, router 20 communicates the updated STP information 32 to the other routing devices by way of a routing protocol. For example, PE control unit 28 may invoke BGP 30C to exchange the STP information with other routing devices. BGP 30C may access STP information 32 directly, or may query STP 30B to determine whether STP information 32 has been updated and to request any updated STP information. Upon receiving the updated STP information 32, BGP 30C encapsulates relevant portions within BGP routing communications and forwards the BGP routing communications to peer BGP routing devices.

In addition, BGP 30C may receive from peer routing devices BGP routing communications that carry updated STP information. Upon receiving the BGP routing communications, BGP 30C extracts the updated STP information. BGP 30C may then directly update STP information 32 or, in some embodiments, may forward the updated STP information to STP 30B. In either case, STP information 32 is updated to reflect the current view of the spanning tree for the L2 networks. STP 30B analyzes STP information to determine whether any loops exists, and relays the STP information to peer L2 devices currently executing STP, such as one or more of CE bridges 6 using STP. For example, STP 30B generates STP BPDUs containing the updated STP information 32, and sends the BPDUs to the peer L2 devices via one or more of the output links 26A-26N and associated IFCs 22.

In this manner, router 20 utilizes a routing protocol to exchange loop detection information, e.g., STP information 32, with other routing devices, thereby allowing router 20 and the other routing devices to maintain an accurate and comprehensive spanning tree for L2 networks 10 to which they provide VPLS or other L2 services.

In one embodiment, router 20 exchanges the L2 loop detection information (e.g., STP information 32) as an extended attribute of a routing protocol such as the BGP. As one example, BGP 30C may encapsulate relevant portions of STP information 32 as VPLS network layer reachability information (NLRI) that is readily communicated in accordance with BGP protocol when advertising routes. More specifically, BGP 30C may define a data type, referred to herein as an L2 loop detection data type, for encapsulating STP information 32. The data type may be conveyed as NLRI information associated with VPLS routes, and may be defined in a manner that causes STP information 32 to be treated as opaque BGP data. As a result, routers and other network devices that support BGP but do not support the extension ignore encoded STP information 32 when communicated by BGP protocol 30C.

While illustrated for exemplary purposes in reference to STP 30B and BGP 30C, router 20 may support a wide variety of other loop detection protocols and/or routing protocols. For example, router 20 may include information associated with a loop detection protocol for an Asynchronous Transfer Mode (ATM) network. Other types of routing protocols that may execute within control unit 28 include the Intermediate System to Intermediate System (ISIS) protocol, the Open Shortest Path First (OSPF) protocol and the Routing Information Protocol. Moreover, although not shown, router 20 may support one or more label switching protocols, such as Multi-protocol Label Switching (MPLS) protocols, Resource Reservation Protocol (RSVP) and the Label Distribution Protocol (LDP). In addition, router 20 may provide other L2 network services in addition to or instead of VPLS 30A

The architecture of router 20 illustrated in FIG. 2 is shown for exemplary purposes only. The principles of the invention are not limited to this architecture. In other embodiments, router 20 may be configured in a variety of ways. In one embodiment, for example, control unit 28 and its corresponding functionality may be distributed within IFCs 22. In another embodiment, control unit 28 may include a routing engine that performs route resolution and maintains a routing information base (RIB), and a forwarding engine that performs packet forwarding based on a forwarding information base (FIB) generated in accordance with the RIB.

Control unit 28 may be implemented solely in software, or hardware, or may be implemented as a combination of software, hardware, or firmware. For example, control unit 28 may include one or more processors which execute software instructions. In that case, the various software modules of control unit 28, such as protocols 30, may comprise executable instructions stored on a computer-readable medium, such as computer memory or hard disk.

Figure 3:
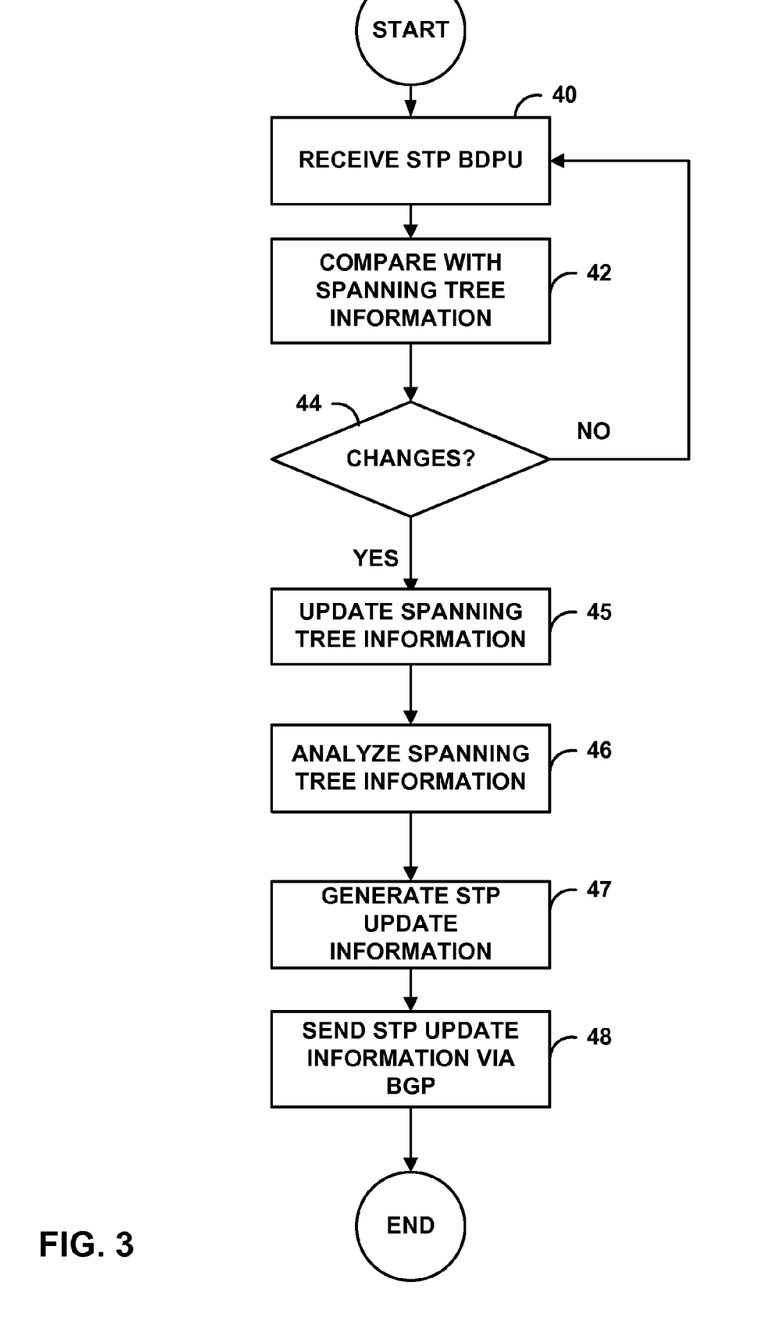
FIG. 3 is a flowchart illustrating exemplary operation of a router in sending spanning tree information via a routing protocol in accordance with the principles of the invention.

FIG. 3 is a flowchart illustrating exemplary operation of a router in communicating loop detection information via a routing protocol in accordance with the principles of the invention. For exemplary purposes, the flowchart of FIG. 3 is described in reference to PE router 4C of FIG. 1.

In the example of FIG. 3, CE bridges 6C and 6C' periodically sends STP BPDUs to exchange STP information. This information typically includes conventional STP information. For example, CE bridge 6C sends STP BPDUs that include information specifying which of the CE bridges 6C and 6C' it views as the root bridge, its calculated distance from the root bridge and other STP information.

PE router 4C receives the STP BPDUs from each of the CE bridges 6C (40), and compares the received STP information to its previously stored STP information (42). If it detects changes to the spanning tree topology (44), PE router 4C updates its spanning tree in accordance with the received STP information (45).

In addition, PE router 4C executes the spanning tree algorithm to analyze the spanning tree topology of the L2 network to detect any data loops, and may update the status of one or more ports upon detecting one or more loops (46). For example, PE router 4C may change the status of a physical or logical port from a forwarding state to a blocking state upon detecting a data loop. In this manner, PE router 4C may effectively eliminate data loops based on the STP information.

In addition, PE router 4C generate STP update information (47) to be sent via a routing protocol, such as encapsulated within the NLRI attribute of one or more BGP VPLS advertised routes. PE router 4C transmits the generated STP update information via BGP to a receiving PE router (48), such as receiving PE router 4A (FIG. 1).

In one embodiment, PE router 4C selectively communicates to the other PE routers 4 a condensed version of the updated STP information. For example, PE router 4C communicates the STP information via BGP so that the other PE routers 4 are not aware of all of the CE bridges 6C and 6C' associated with PE router 4C. In other words, PE router 4C adds a layer of abstraction that shields the other PE routers from the particular details of CE bridges 6C and 6C'. For example, rather than conveying to the other PE routers 4 STP information for each of CE bridges 6C and 6C', PE router 4C communicates only an abstracted view of the bridges. For example, PE router 4C may communicate its knowledge of which of CE bridges 6C and 6C' bridge is currently viewed as the root bridge, the calculated distance from the root bridge and other relevant STP information based on what it has derived from its CE bridges 6C and 6C'. In this manner, the communication and resource burden placed on intermediate network 12 and PE routers 4 may be reduced.

Figure 4:
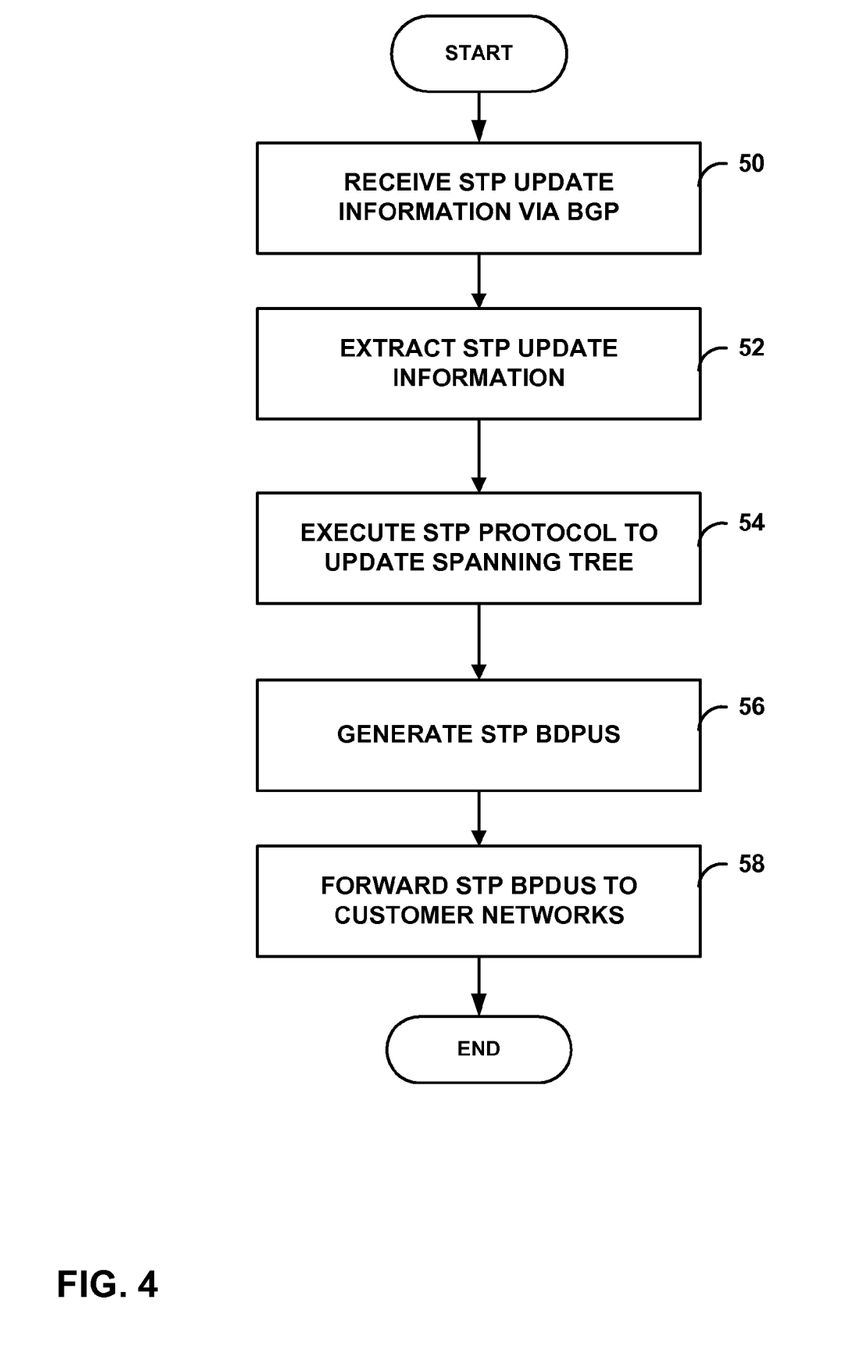
FIG. 4 is a flowchart illustrating exemplary operation of a router in receiving spanning tree information via a routing protocol in accordance with the principles of the invention.

FIG. 4 is a flowchart illustrating exemplary operation of a router in receiving loop detection information via a routing protocol in accordance with the principles of the invention. For exemplary purposes, the flowchart of FIG. 3 is described in reference to PE router 4A of FIG. 1 and, more specifically, the use of BGP to convey STP information.

As illustrated in FIG. 1, each of PE routers 4, such as PE router 4A, receives STP information via BGP across the intermediate network 12 (50). As an example, PE router 4A may receive BGP communications sent by a sending PE router 4C. The BGP communications encapsulate STP information as, for example, NLRI attributes associated with VPLS routes.

PE router 4A extracts the STP information from the BGP communication (52) and executes STP to update its spanning tree information in accordance with the information received (54).

In addition, PE router 4A generates STP BPDUs containing this updated STP information (56). PE router 4A forwards the BPDUs to L2 devices associated with its respective customer networks in accordance with the spanning tree protocol (58). For example, PE router 4A may send the updated STP information by sending BPDUs to CE bridge 6A associated with L2 network 10.

Various embodiments of the invention have been described. These and other embodiments are within the scope of the following claims.

The invention claimed is:

1. A method for synchronizing spanning tree information between layer two (L2) devices associated with a plurality of L2 networks coupled to an intermediate network that includes a plurality of provider edge routing devices, the method comprising:
   receiving information associated with a loop detection protocol from a first one of the L2 devices associated with a first one of the L2 networks, wherein the information is received as one or more bridge protocol data units (BPDUs) containing spanning tree information associated with the loop detection protocol; and
   communicating a routing protocol message that includes the BPDUs through an intermediate network via a provider edge routing device in accordance with a routing protocol, wherein the routing protocol message includes the BPDUs as opaque data of the routing protocol message such that at least one routing device within the intermediate network ignores the opaque data when forwarding the routing protocol message,
   wherein communicating the routing protocol message comprises communicating the BPDUs such that a second L2 device associated with a second one of the L2 networks receiving the BPDUs can maintain spanning tree information that represents the plurality of L2 networks as a single comprehensive spanning tree in which the plurality of provider edge routing devices are represented as a single node,
   wherein the intermediate network does not run the loop detection protocol between the provider edge routers of the intermediate network.

2. The method of claim 1, further comprising:
   executing a virtual private LAN service (VPLS) to form a virtual network between the first L2 network and the second L2 network coupled by the intermediate network; and
   updating L2 topology data based on the information to reflect a topology of the first L2 network, the second L2 network, and the virtual network.

3. The method of claim 2, further comprising:
   analyzing the L2 topology data with the routing device to detect any loops; and
   updating a status of one or more ports of the routing device upon detecting one or more loops.

4. The method of claim 1, further comprising:
   receiving BPDUs containing spanning tree information associated with the loop detection protocol from a plurality of the L2 devices; and
   selecting one of the plurality of L2 devices as a root L2 device, and
   wherein communicating the routing protocol message comprises communicating a routing protocol message that identifies the selected one of the plurality of L2 devices as the root L2 device.

5. The method of claim 1, wherein communicating comprises:
   comparing the information associated with the loop detection protocol with topology data to determine whether a change to a topology of an L2 network has occurred; and
   selectively communicating the information associated with the loop detection protocol via the routing protocol based on the comparison.

6. The method of claim 1, wherein communicating comprises communicating the a routing protocol message via the routing protocol that includes advertised routes in the routing protocol message.

7. The method of claim 1, wherein communicating comprises communicating the BPDUs via the routing protocol as network layer reachability information (NLRI) of the routing protocol message that is associated with an advertised route.

8. The method of claim 1, wherein communicating through an intermediate network comprises communicating the routing protocol message via the Border Gateway Protocol (BGP).

9. The method of claim 1, wherein receiving comprises receiving bridge protocol data units (BPDUs) containing spanning tree information in accordance with the spanning tree protocol (STP).

10. The method of claim 1,
    wherein the L2 devices comprise Ethernet bridges, and
    wherein the provider edge routing device comprises provider edge router.

11. The method of claim 10,
    wherein receiving the information comprises:
       receiving, from a plurality of Ethernet bridges, BPDUs containing spanning tree information; and
    wherein communicating comprises:
       selecting a subset of the information contained within the BPDUs, and
       communicating the selected subset of information via the routing protocol to present the plurality of Ethernet bridges as a single Ethernet bridge.

12. A method for synchronizing spanning tree information between layer two (L2) devices associated with a plurality of L2 networks coupled to an intermediate network that includes a plurality of provider edge routing devices, comprising:
    receiving, with a provider edge routing device, information associated with a layer two (L2) network loop detection protocol via a routing protocol message that includes the information as opaque data of the routing protocol message such that at least one routing device within the intermediate network ignores the opaque data when forwarding the routing protocol message,
    wherein the provider edge routing device does not run the loop detection protocol between other provider edge routers of the intermediate network; and
    forwarding the information as one or more bridge protocol data units (BPDUs) containing the information associated with the loop detection protocol to an L2 device associated with an L2 network such that the L2 device can maintain spanning tree information that represents the plurality of L2 networks as a single comprehensive spanning tree in which the plurality of provider edge routing devices are represented as a single node.

13. The method of claim 12, further comprising:
    updating topology data in accordance with the received information; and
    analyzing the topology data to determine whether any loops exist within the L2 network.

14. The method of claim 12,
    wherein the information conforms to the spanning tree protocol (STP), and
    wherein forwarding the information comprises forwarding the information to the L2 device in accordance with the STP.

15. The method of claim 14, wherein forwarding the information comprises:
generating bridge protocol data units (BPDUs) containing the spanning tree information; and
sending the BPDUs to the L2 device.

16. The method of claim 12, wherein receiving the information comprises receiving the information in a routing protocol message that includes advertised routes.

17. The method of claim 12, wherein receiving the information comprises receiving the information as network layer reachability information (NLRI) of the routing protocol message associated with an advertised route.

18. The method of claim 12, wherein receiving the information via a routing protocol comprises receiving the information via a routing protocol message that conforms to the Border Gateway Protocol (BGP).

19. The method of claim 12, wherein the L2 network is a first L2 network, the method further comprising:
executing a virtual private LAN service (VPLS) to form a virtual network between the plurality of L2 networks; and
updating topology data to reflect a topology of the virtual network and the plurality of L2 networks.

20. The method of claim 19, further comprising:
analyzing the topology data to detect any loops; and
updating a status of one or more ports of the provider edge routing device upon detecting one or more loops.

21. A provider edge routing device comprising:
a physical interface that receives layer two (L2) loop detection information associated with a loop detection protocol from a first one of a plurality of L2 devices associated with a first one of a plurality of L2 networks coupled to an intermediate network that includes a plurality of provider edge routing devices, wherein the information is received as one or more bridge protocol data units (BPDUs) containing spanning tree information associated with the loop detection protocol; and
a control unit that outputs a routing protocol message to communicate the BPDUs through the intermediate network via a routing protocol, wherein the routing protocol message includes the BPDUs as opaque data of the routing protocol message such that at least one routing device within the intermediate network ignores the opaque data when forwarding the routing protocol message,
wherein the control unit communicates the BPDUs such that a second L2 device associated with a second one of the L2 networks receiving the BPDUs can maintain spanning tree information that represents the plurality of L2 networks as a single comprehensive spanning tree in which the plurality of provider edge routing devices are represented as a single node,
wherein the intermediate network does not run the loop detection protocol between the provider edge routers of the intermediate network.

22. The device of claim 21, further comprising:
a virtual private LAN service (VPLS) module that forms a virtual network between the plurality of L2 networks; and
a module that executes an L2 loop detection protocol to detect loops within the virtual network in accordance with the L2 loop detection information.

23. The device of claim 21,
wherein the L2 loop detection information comprises spanning tree protocol (STP) information, and
wherein the device further comprises an STP module that, upon receiving the information, uses the L2 loop detection information to detect loops within an L2 network.

24. The device of claim 23, wherein the STP module analyzes the topology to detect any loops within the L2 device, and updates a status of one or more ports of the device upon detecting one or more loops.

25. The device of claim 21, wherein the control unit includes a border gateway protocol (BGP) module that communicates the L2 loop detection information via the BGP.

26. The device of claim 21, wherein the control unit receives the information from the plurality of L2 devices, selects a subset of the information received from the plurality of L2 devices, and communicates the selected subset information via the routing protocol to present the plurality of L2 devices as a single device.

27. The device of claim 21,
wherein the control unit stores topology data to reflect a topology of the first L2 network, and
wherein the control unit compares the L2 loop detection information with the topology data to determine whether a change to the topology has occurred, and selectively communicates loop detection information via the routing protocol based on the comparison.

28. The device of claim 21, wherein the control unit communicates the L2 loop detection information as information associated with a route advertised by the routing protocol message.

29. The device of claim 21, wherein the control unit communicates the L2 loop detection information as network layer reachability information (NLRI) associated with a route advertised by the routing protocol message.

30. The device of claim 21,
wherein the control unit receives the L2 loop detection information from an Ethernet bridge, and
wherein the control unit communicates the routing communication to a router via the routing protocol.

31. A provider edge routing device comprising:
a physical interface;
a routing module that receives loop detection information via a routing protocol message received on the physical interface, wherein the routing protocol message includes the information as opaque data of the routing protocol message such that at least one routing device within an intermediate network ignores the opaque data when forwarding the routing protocol message; and
a loop detection module that determines whether one or more loops exist within a network based on the received loop detection information, wherein the provider edge routing device does not run the loop detection protocol between other provider edge routers of the intermediate network.

32. The device of claim 31, wherein the loop detection module forwards the loop detection information to a layer two (L2) device in accordance with a loop detection protocol such that the L2 device can maintain spanning tree information that represents the plurality of L2 networks as a single comprehensive spanning tree in which the plurality of provider edge routing devices are represented as a single node.

33. The device of claim 32, further comprising:
a virtual private LAN service (VPLS) module that forms a virtual network between two or more L2 networks,
wherein the loop detection module updates L2 topology data based on the loop detection information to reflect a topology of the two or more L2 networks and the virtual network.

34. The device of claim 31, wherein the loop detection information comprises spanning tree protocol (STP) information.

35. The device of claim 31, wherein the loop detection module updates a status of one or more ports upon detecting one or more loops.

36. The device of claim 31, wherein the routing module comprises a border gateway protocol (BGP) module that receives the loop detection information via the BGP.

37. The device of claim 31, wherein the loop detection module generates one or more bridge protocol data units (BPDUs) containing the loop detection information, and sends the BPDUs to one or more L2 devices associated with an L2 network.

38. The device of claim 31, wherein the routing module receives the loop detection information with a route advertised by the routing protocol.

39. The device of claim 31, wherein the routing module receives the information as network layer reachability information (NLRI) associated with a route advertised by the routing protocol.

40. A non-transitory computer-readable medium comprising instructions for causing a programmable processor to:
  execute a virtual private LAN service (VPLS) to form a virtual network between a first layer two (L2) network and a second L2 network coupled by an intermediate network;
  receive spanning tree information from an L2 device of the first L2 network via the spanning tree protocol (STP), wherein the information is received as one or more bridge protocol data units (BPDUs) containing spanning tree information; and
  communicate a routing protocol message that includes the spanning tree information through the intermediate network via provider edge routing device in accordance with a routing protocol to a routing device associated with the second L2 network, wherein the routing protocol message includes the BPDUs as opaque data of the routing protocol message such that at least one routing device within the intermediate network ignores the opaque data when forwarding the routing protocol message,
  wherein the instructions to communicate comprises instructions to communicate the BPDUs such that a second L2 device associated with the second L2 network receiving the BPDUs can maintain spanning tree information that represents the L2 networks as a single comprehensive spanning tree in which the plurality of provider edge routing devices are represented as a single node,
  wherein the intermediate network does not run the loop detection protocol between the provider edge routers of the intermediate network.

41. The computer-readable medium of claim 40, further comprising instructions for causing the programmable processor to:
  maintain a topology for the first L2 network and second L2 network;
  analyze the topology to detect any loops; and
  selectively disable forwarding of network packets based on whether any loops are detected.

42. The computer-readable medium of claim 40, further comprising instructions for causing the programmable processor to:
  maintain a topology for the first L2 network and second L2 network;
  compare the spanning tree information with the topology to determine whether any changes to the topology have occurred; and
  selectively communicate the spanning tree information via the routing protocol based on this comparison.

43. The computer-readable medium of claim 40, further comprising instructions for causing the programmable processor to communicate the spanning tree information via a Border Gateway Protocol (BGP) routing protocol message that contains the spanning tree information as network layer reachability information (NLRI) associated with an advertised route.

44. The computer-readable medium of claim 40, further comprising instructions for causing the programmable processor to receive the spanning tree information from the L2 device via bridge protocol data units (BPDUs) containing spanning tree information, wherein the L2 device comprises an Ethernet bridge, and wherein the provider edge routing device comprises an edge router associated with a service provider.

45. A non-transitory computer-readable medium comprising instructions for causing a programmable processor of a provider edge routing device to:
  maintain routing information that represents a topology of a intermediate network;
  forward packets in accordance with the routing information;
  receive a routing communication via a routing protocol, wherein the routing communication comprises a routing protocol message that includes information associated with a layer two (L2) loop detection protocol, wherein the routing protocol message includes the information as opaque data of the routing protocol message such that at least one routing device within the intermediate network ignores the opaque data when forwarding the routing protocol message,
  wherein the provider edge routing device does not run the loop detection protocol between other provider edge routers of the intermediate network; and
  forward the information as one or more bridge protocol data units (BPDUs) containing the information associated with the loop detection protocol to an L2 device via the L2 loop detection protocol such that the L2 device can maintain spanning tree information that represents a plurality of L2 networks as a single comprehensive spanning tree in which a plurality of provider edge routing devices are represented as a single node.

46. The computer-readable medium of claim 45, further comprising instructions for causing a programmable processor to:
  execute a virtual private LAN service (VPLS) to form a virtual network between a first L2 network and a second L2 network,
  analyze the information to detect any loops within the first L2 and second L2 network, and
  selectively disable the forwarding of at least some of the packets upon detecting one or more loops.

47. The computer-readable medium of claim 45, wherein the instructions cause the programmable processor to receive the information as network layer reachability information (NLRI) associated with an advertised route.

48. The computer-readable medium of claim 45, wherein the instructions cause the programmable processor to receive the information via the Border Gateway Protocol (BGP).

* * * * *